United States Patent
Hecht (10) Patent No.: US 11,453,065 B2
(45) Date of Patent: Sep. 27, 2022

(54) CUTTING INSERT HAVING LOWER ANTI-SLIP RECESS, INSERT HOLDER AND CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

(*) Notice: Subject to any disclaimer, the term of this patent is extended or adjusted under 35 U.S.C. 154(b) by 385 days.

(21) Appl. No.: 16/421,828

(22) Filed: May 24, 2019

(65) Prior Publication Data

US 2020/0368823 A1    Nov. 26, 2020

(51) Int. Cl.
*B23B 27/16*        (2006.01)

(52) U.S. Cl.
CPC .. *B23B 27/1625* (2013.01); *B23B 2200/0471* (2013.01); *B23B 2200/088* (2013.01); *B23B 2200/165* (2013.01); *B23B 2205/12* (2013.01)

(58) Field of Classification Search
CPC ............ B23B 27/1614; B23B 27/1644; B23B 27/1662; B23B 27/1677; B23B 2200/165; B23B 2200/16; B23B 2200/3627; B23B 2205/04; B23B 2205/12; B23B 2205/00; B23B 2200/0471; B23B 2200/086; B23B 27/1625; B23B 27/164; B23B 27/1666; B23B 27/1651; B23B 2200/088;
(Continued)

(56) References Cited

U.S. PATENT DOCUMENTS

| 1,332,736 A | * | 3/1920 | McQueston | B23C 5/24 |
| | | | | 407/45 |
| 1,836,543 A | * | 12/1931 | Monosmith | B23C 5/2239 |
| | | | | 407/38 |

(Continued)

FOREIGN PATENT DOCUMENTS

| AT | 295961 B | * | 1/1972 |
| CH | 244649 A | * | 9/1946 |

(Continued)

OTHER PUBLICATIONS

Description JPH06126511A (translation) obtained at https://worldwide.espacenet.com/ (last visited Apr. 12, 2022).*

(Continued)

*Primary Examiner* — Ryan Rufo
(74) *Attorney, Agent, or Firm* — Womble Bond Dickinson (US) LLP (57) ABSTRACT

A cutting insert includes an insert peripheral surface that includes at least one planar major insert side abutment surface and an insert lower surface that includes an anti-slip recess recessed therein. The anti-slip recess includes at least one elongated and straight anti-slip groove. Each major insert side abutment surface is oriented parallel to a groove longitudinal axis of a respective anti-slip groove. An insert holder includes a holder pocket. The holder pocket includes a pocket peripheral surface which includes planar major pocket side abutment surface and a pocket base surface having an elongated and straight anti-slip rib. When the cutting insert is releasably attached to the insert holder, to constitute a fastened position of a cutting tool, the anti-slip rib is located in the anti-slip groove that is oriented parallel to the major insert side abutment surface that abuts the major pocket side abutment surface.

5 Claims, 7 Drawing Sheets

(58) Field of Classification Search
CPC ............... B23C 5/2208; B23C 5/2204; B23C 2200/165; B23C 2200/16; B23C 2200/168; B23C 2200/0455; B23C 5/2265; B23C 5/2269; B23C 5/2273; B23C 5/2278; B23C 5/2282; B23C 2210/168; B23C 5/2239; B23C 5/2243; B23C 5/2247; B23C 5/226; B23C 5/165; B23C 2200/086

See application file for complete search history.

(56) References Cited

U.S. PATENT DOCUMENTS

| | | | | |
|---|---|---|---|---|
| 4,315,706 | A * | 2/1982 | Erkfritz | B23B 27/1611 |
| | | | | 407/101 |
| 4,697,963 | A * | 10/1987 | Luck | B23B 27/1651 |
| | | | | 407/111 |
| 5,033,916 | A | 7/1991 | Dunklau | |
| 5,888,028 | A * | 3/1999 | Grainger | B23B 27/1666 |
| | | | | 407/111 |
| 6,017,172 | A * | 1/2000 | Ukegawa | B23B 27/1651 |
| | | | | 407/119 |
| 6,146,061 | A | 11/2000 | Larsson | |
| 6,196,774 | B1 | 3/2001 | Minshall | |
| D445,811 | S | 7/2001 | Alexander, IV | |
| 7,121,769 | B2 | 10/2006 | Satran et al. | |
| 7,645,100 | B2 | 1/2010 | Andersson et al. | |
| 8,313,270 | B2 | 11/2012 | Hecht | |
| 9,016,985 | B2 * | 4/2015 | Amor | B23B 27/164 |
| | | | | 407/107 |
| 9,481,038 | B2 | 11/2016 | Hecht | |
| 2002/0034425 | A1 * | 3/2002 | Dunklau | B23B 27/1651 |
| | | | | 407/119 |
| 2003/0210961 | A1 | 11/2003 | Arvidsson | |
| 2005/0129470 | A1 * | 6/2005 | Bellinger | B23C 5/2252 |
| | | | | 407/40 |
| 2006/0263153 | A1 * | 11/2006 | Isaksson | B23B 27/065 |
| | | | | 407/113 |
| 2009/0252566 | A1 * | 10/2009 | Minshall | B23D 77/025 |
| | | | | 407/102 |
| 2011/0255926 | A1 | 10/2011 | Hecht | |
| 2012/0014758 | A1 * | 1/2012 | Hall | B23C 5/2273 |
| | | | | 407/113 |
| 2013/0170918 | A1 | 7/2013 | Hecht | |
| 2014/0044496 | A1 * | 2/2014 | Shankaregowda | B23C 5/202 |
| | | | | 407/107 |
| 2015/0217387 | A1 | 8/2015 | Kress | |
| 2016/0016233 | A1 * | 1/2016 | Sanjeevasetty | B23B 27/164 |
| | | | | 407/115 |

FOREIGN PATENT DOCUMENTS

| | | | | |
|---|---|---|---|---|
| DE | 4203544 | A1 * | 8/1993 | |
| DE | 198 47 227 | | 4/2000 | |
| DE | 10 2009 027 153 | | 12/2009 | |
| EP | 1864741 | A2 * | 12/2007 | |
| FR | 639824 | | 6/1928 | |
| GB | 929691 | A * | 6/1963 | ........... B23B 27/164 |
| GB | 1557481 | A * | 12/1979 | |
| JP | 06126511 | A * | 5/1994 | ........... B23B 27/145 |
| JP | 2008-155318 | | 7/2008 | |
| SU | 1036462 | A1 * | 8/1983 | ........... B23B 27/145 |

OTHER PUBLICATIONS

International Search Report dated Aug. 11, 2020, issued in PCT counterpart application (No. PCT/IL2020/050472).

Written Opinion dated Aug. 11, 2020, issued in PCT counterpart application (No. PCT/IL2020/050472).

* cited by examiner

CUTTING INSERT HAVING LOWER ANTI-SLIP RECESS, INSERT HOLDER AND CUTTING TOOL

FIELD OF THE INVENTION

The subject matter of the present application relates to cutting tools of the type in which a cutting insert is releasably retained in a holder pocket of an insert holder, and in particular to such cutting tools having an anti-slip arrangement.

BACKGROUND OF THE INVENTION

Cutting inserts can be releasably clamped in a holder pocket of an insert holder by a mounting mechanism, such as a retaining screw or a clamping arm. In case of failure of the mounting mechanism, the cutting insert can be displaced in the holder pocket. Such an event is particularly problematic for cutting tools which are non-fixed cutting tools, such as rotary cutting tools (e.g. milling cutters) where the cutting insert can be dislodged entirely from the holder pocket at high speed causing damage and/or injury to machinery and/or users. Cutting tools can thus be provided with an anti-slip arrangement for preventing the cutting insert from slipping out of the holder pocket.

In some such anti-slip arrangements, the cutting insert can include a recess and the holder pocket can include a projection, which is located in the recess when the cutting tool is assembled position. One example is disclosed in, for example, U.S. Pat. No. 7,645,100, where the turning insert is engaged with the insert seat via an interface that includes elongate and straight, female-like and male-like engagement members, which are in engagement with each other in order to prevent rotation of the turning insert within the insert pocket.

Another example is disclosed in U.S. Pat. No. 9,481,038, in which the cutting insert's anti-slip arrangement includes first, second and third insert abutment surfaces having dovetail portions, each of which forms an external and acute dovetail angle with an insert base surface. The dovetail portions are configured for securing the cutting insert to a machine tool.

SUMMARY OF THE INVENTION

In accordance with a first aspect of the subject matter of the present application there is provided a cutting insert, having insert central axis defining opposite upward and downward directions, the cutting insert comprising:
  opposite insert upper and lower surfaces and an insert peripheral surface extending therebetween, the insert peripheral surface extending circumferentially about the insert central axis and comprising at least one planar major insert side abutment surface;
  at least one upper cutting edge formed at the intersection of the insert peripheral surface and the insert upper surface and circumferentially displaced from the at least one major insert side abutment surface; and
  an anti-slip recess recessed in the insert lower surface, defining a lower anti-slip recess, the lower anti-slip recess comprising at least one elongated and straight anti-slip groove having:
    a groove longitudinal axis;
    a first groove plane containing the groove longitudinal axis and the insert central axis;
    a second groove plane perpendicular to the first groove plane and containing the insert central axis; and
    two axially extending opposite groove extremities and a groove middle portion therebetween, the groove middle portion being intersected by the insert central axis; wherein:
      the cutting insert is devoid of a through hole opening out to the insert upper and lower surfaces, for receiving a retaining screw; and
    each major insert side abutment surface is oriented parallel to the groove longitudinal axis of a respective anti-slip groove.

In accordance with a second aspect of the subject matter of the present application there is provided an insert holder, having a holder longitudinal axis defining opposite forward and rearward directions and comprising:
  a holder main surface that intersects a holder end surface; and
  a holder pocket recessed in the holder main surface and opening out thereto at a pocket major opening, the holder pocket having a pocket major axis and comprising:
    a pocket base surface;
    a pocket peripheral surface oriented substantially perpendicularly to the pocket base surface and forming a partial boundary thereof, the pocket base surface being unbounded by the pocket peripheral surface at the pocket major opening, the pocket peripheral surface extending circumferentially about the pocket major axis and comprising a planar major pocket side abutment surface located opposite, and facing towards, the pocket major opening;
    a pocket overhang portion integrally formed with the holder pocket overhanging the pocket base surface; and
    an elongated and straight anti-slip rib projecting from the pocket base surface, the anti-slip rib extending longitudinally along a rib longitudinal axis and comprising:
      a first rib plane containing the rib longitudinal axis and the pocket major axis; and
      a second rib plane perpendicular to the first rib plane and containing the pocket major axis; wherein:
    the major pocket side abutment surface is oriented parallel to the rib longitudinal axis.

In accordance with a third aspect of the subject matter of the present application there is provided a cutting tool comprising:
  a cutting insert, having insert central axis defining opposite upward and downward directions, the cutting insert comprising:
    opposite insert upper and lower surfaces and an insert peripheral surface extending therebetween, the insert peripheral surface extending circumferentially about the insert central axis and comprising at least one planar major insert side abutment surface;
    at least one upper cutting edge formed at the intersection of the insert peripheral surface and the insert upper surface and circumferentially displaced from the at least one major insert side abutment surface; and
    an anti-slip recess recessed in the insert lower surface, defining a lower anti-slip recess, the lower anti-slip recess comprising at least one elongated and straight anti-slip groove having:
      a groove longitudinal axis;
      a first groove plane containing the groove longitudinal axis and the insert central axis;
      a second groove plane perpendicular to the first groove plane and containing the insert central axis; and two axially extending opposite groove extremities and a groove middle portion therebetween, the groove middle portion being intersected by the insert central axis; wherein:

each major insert side abutment surface is oriented parallel to the groove longitudinal axis of a respective anti-slip groove; and an insert holder, having a holder longitudinal axis defining opposite forward and rearward directions and comprising:

a holder main surface that intersects a holder end surface; and a holder pocket recessed in the holder main surface and opening out thereto at a pocket major opening, the holder pocket having a pocket major axis and comprising:

a pocket base surface;

a pocket peripheral surface oriented substantially perpendicularly to the pocket base surface and forming a partial boundary thereof, the pocket base surface being unbounded by the pocket peripheral surface at the pocket major opening, the pocket peripheral surface extending circumferentially about the pocket major axis and comprising a planar major pocket side abutment surface located opposite, and facing towards, the pocket major opening; and an elongated and straight anti-slip rib projecting from the pocket base surface, the anti-slip rib extending longitudinally along a rib longitudinal axis and comprising:

a first rib plane containing the rib longitudinal axis and the pocket major axis; and a second rib plane perpendicular to the first rib plane and containing the pocket major axis; wherein:

the major pocket side abutment surface is oriented parallel to the rib longitudinal axis; wherein:

the cutting tool is adjustable between a released and fastened position; and in the fastened position of the cutting tool:

the cutting insert is releasably retained in the holder pocket;

the major pocket side abutment surface abuts an operative major insert side abutment surface;

at least one pocket support surface located on the pocket base surface abuts an insert lower bearing surface located on the insert lower surface; and the anti-slip rib is located in an operative anti-slip groove that is oriented parallel to the operative major insert side abutment surface.

It is understood that the above-said is a summary, and that features described hereinafter may be applicable in any combination to the subject matter of the present application, for example, any of the following features may be applicable to the cutting insert, insert holder or cutting tool:

The cutting insert can be N-way indexable on the insert upper surface. The at least one upper cutting edge can comprise N upper cutting edges circumferentially spaced apart about the insert central axis, N being a positive integer greater than 1. The at least one anti-slip groove can comprise M anti-slip grooves, where M=N/2 when N is even or M=N when N is odd.

The lower anti-slip recess can comprise a plurality of anti-slip grooves equally angularly arranged about the insert central axis and intersecting one another.

The plurality of anti-slip grooves can be identical.

The lower anti-slip recess can exhibit rotational symmetry about the insert central axis.

The at least one anti-slip groove can exhibit mirror symmetry about the first groove plane and also the second grove plane.

The at least one anti-slip groove can be spaced apart from the insert peripheral surface.

the insert lower surface can comprise an insert lower bearing surface which is planar and oriented perpendicular to the insert central axis.

The at least one anti-slip groove can comprise two opposite groove side walls and a groove central surface extending therebetween, the two opposite groove side walls and the groove central surface all extending longitudinally along the groove longitudinal axis. In a cross sectional view taken in the first groove plane, the groove central surface can decrease in depth in a direction away from the groove middle portion towards the two groove extremities.

The groove central surface can be concavely curved in a direction along the groove longitudinal axis and can have a groove radius.

In a cross sectional view taken in a plane perpendicular to the groove longitudinal axis and passing through the at least one anti-slip groove, the two groove side walls can converge towards each other in a direction from the insert lower surface towards the insert upper surface.

The lower anti-slip recess may not open out to the insert upper surface.

The insert peripheral surface can further comprise a planar minor insert side abutment surface circumferentially spaced apart from the at least one major insert side abutment surface about the insert central axis.

The cutting insert can further comprise at least one lower cutting edge formed at the intersection of the insert peripheral surface and the insert lower surface and an additional anti-slip recess recessed in the insert upper surface, defining an upper anti-slip recess, the upper and lower anti-slip recesses having the same number of anti-slip grooves.

The upper and lower anti-slip recesses can be identical.

The cutting insert can comprise exactly two upper cutting edges and exactly two lower cutting edges. The upper and lower anti-slip recesses can each comprise exactly one anti-slip groove. The anti-slip groove at the lower anti-slip recess can be oriented perpendicular to the anti-slip groove at the upper anti-slip recess.

The cutting insert can comprise exactly four upper cutting edges. The lower anti-slip recesses can comprise exactly two anti-slip grooves oriented perpendicular to each other.

The at least one anti-slip groove can be a pressed groove lacking indicia that it has been formed by grinding, and lacking an undercut in a direction along the insert central axis.

The at least one anti-slip groove can extend continuously along the groove longitudinal axis.

The anti-slip rib can comprise two axially extending opposite rib extremities and a rib middle portion therebetween, the rib middle portion being intersected by the pocket major axis.

The pocket base surface can comprise at least one pocket support surface which is planar and oriented perpendicular to the pocket major axis.

The at least one pocket support surface can comprise exactly two co-planar pocket support surfaces located on opposite sides of the anti-slip rib.

The pocket major axis can intersect the pocket overhang portion.

The pocket peripheral surface can further comprise a planar minor pocket side abutment surface circumferentially spaced apart from the major pocket side abutment surface about the pocket major axis.

The anti-slip rib can be spaced apart from the minor pocket side abutment surface.

The holder pocket can open out to a pocket outer lateral surface of the insert holder at a pocket minor opening opposite the minor pocket side abutment surface, the pocket base surface being unbounded by the pocket peripheral surface at the pocket minor opening.

The pocket outer lateral surface can be formed on the holder end surface.

The anti-slip rib can be spaced apart from the pocket minor opening.

The anti-slip rib can exhibit mirror symmetry about the first rib plane and also about the second rib plane.

The anti-slip rib can comprise two rib side walls and a rib central surface extending therebetween, the two rib side walls and the rib central surface all extending longitudinally in the direction of the rib longitudinal axis. In a cross sectional view taken in the first rib plane, the rib central surface can decrease in height in a direction away from the rib middle portion towards the two rib extremities.

The rib central surface can be convexly curved in a direction along the rib longitudinal axis and can have a rib radius.

In a cross sectional view taken in a plane perpendicular to the rib longitudinal axis and passing through the anti-slip rib, the two rib side walls can converge towards each other in a direction away from the pocket base surface towards the pocket overhang portion.

The holder pocket can be devoid of a threaded hole opening out to the pocket base surface, for threadingly engaging a retaining screw.

The pocket overhang portion can comprise an overhang inner surface which faces towards the pocket base surface and an overhang transverse surface which intersects the overhang inner surface and is oriented transversely thereto. The holder pocket can comprise a pocket threaded bore which is recessed in, and opens out to, at least the overhang transverse surface.

The anti-slip rib can extend continuously along the rib longitudinal axis. The lower anti-slip recess can comprise a plurality of anti-slip grooves. In the fastened position of the cutting tool any anti-slip grooves oriented non-parallel to the operative major pocket side abutment surface can be unoccupied.

In the fastened position of the cutting tool the anti-slip rib may not abut the operative anti-slip groove.

The insert peripheral surface can further comprise at least one planar minor insert side abutment surface circumferentially spaced apart from the at least one major insert side abutment surface about the insert central axis. The pocket peripheral surface can further comprise a planar minor pocket side abutment surface circumferentially spaced apart from the major pocket side abutment surface about the pocket major axis. In the fastened position of the cutting tool the minor pocket side abutment surface can abut an operative minor insert side abutment surface.

The insert upper surface can comprise an insert upper clamping surface. The insert holder can comprise a separate clamping member comprising a clamping male threaded portion and a clamping female portion. The holder pocket can further comprise a pocket threaded bore which is recessed in, and open out to, at least the overhang transverse surface and a pocket overhang portion integrally formed with the holder pocket overhanging the pocket base surface, the pocket overhang portion comprising an overhang inner surface which faces towards the pocket base surface and an overhang transverse surface which intersects the overhang inner surface and is oriented transversely thereto. In the fastened position of the cutting tool, the cutting insert can be releasably retained to the insert holder by the clamping male threaded portion threadingly received in the pocket threaded bore and the clamping female portion in clamping abutment with the insert upper clamping surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
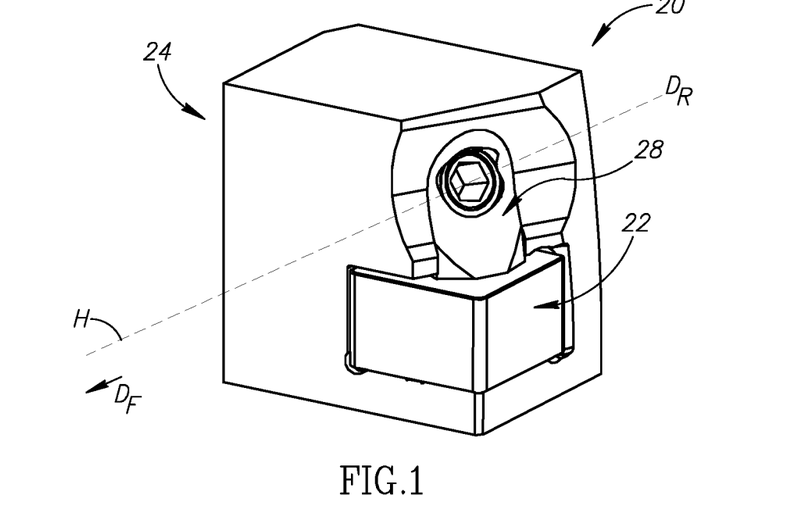
FIG. 1 is a perspective view of a holder pocket and a double-sided cutting insert of a cutting tool.
Figure 2:
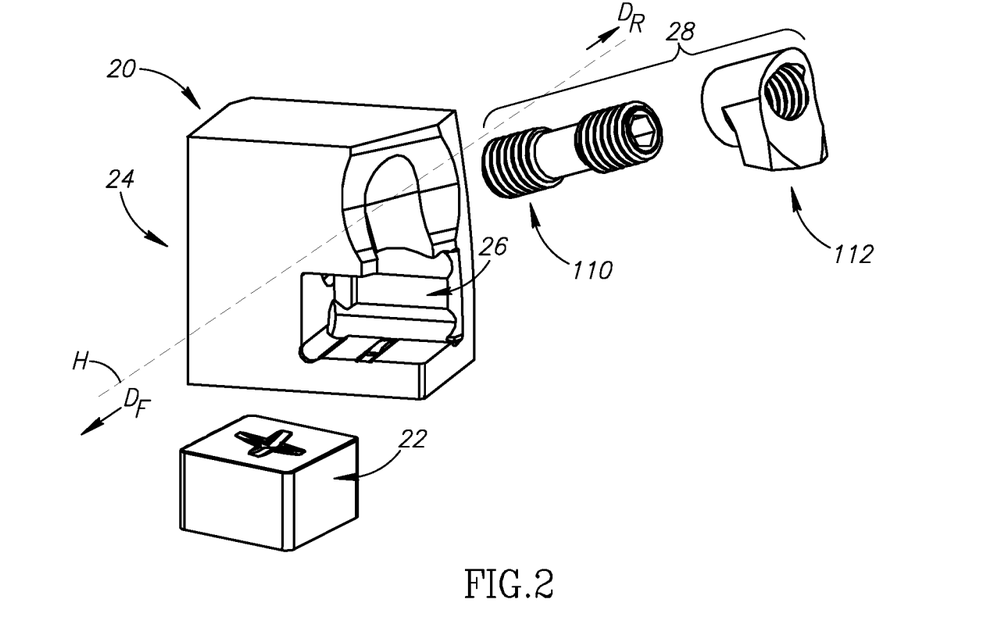
FIG. 2 is an exploded view of FIG. 1.

Attention is first drawn to FIGS. 1 and 2 showing a cutting tool 20, for chip removal, in accordance with embodiments of the subject matter of the present application. The cutting tool 20 has a cutting insert 22 which can be typically made from cemented carbide or ceramic. The cutting tool 20 also has an insert holder 24 having a holder pocket 26. The insert holder 24 can be typically made from steel. In this non-limiting example, the cutting tool 20 is a rotary milling tool and the cutting insert 22 is a milling insert. It is noted, however, that the subject matter of the present application also applies to other types of cutting tools and cutting inserts, for example, but not limited to, turning tools and turning inserts. The cutting tool 20 is adjustable between a released and fastened position. In the fastened position of the cutting tool 20, the cutting insert 22 is releasably attached to the insert holder 24, for example, by a clamping member 28 which clamps the cutting insert 22 in the holder pocket 26.

Figure 3:
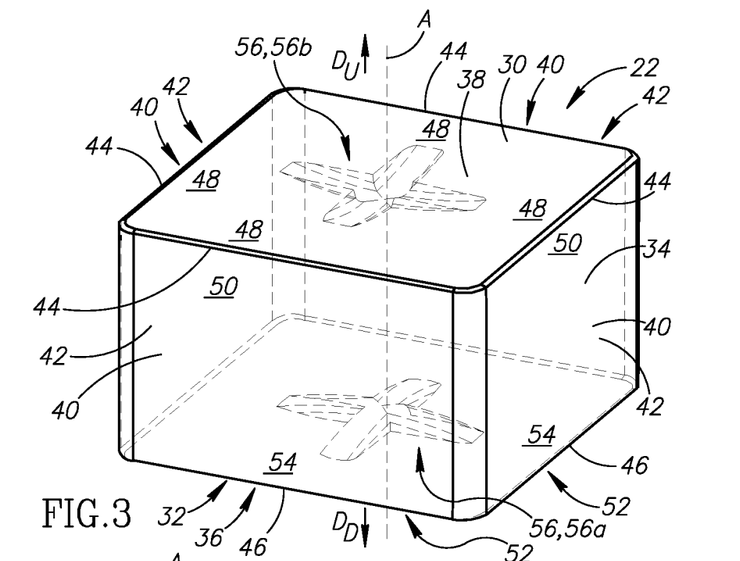
FIG. 3 is a perspective view of the cutting insert in FIG. 1, in accordance with the present invention.
Figure 4:
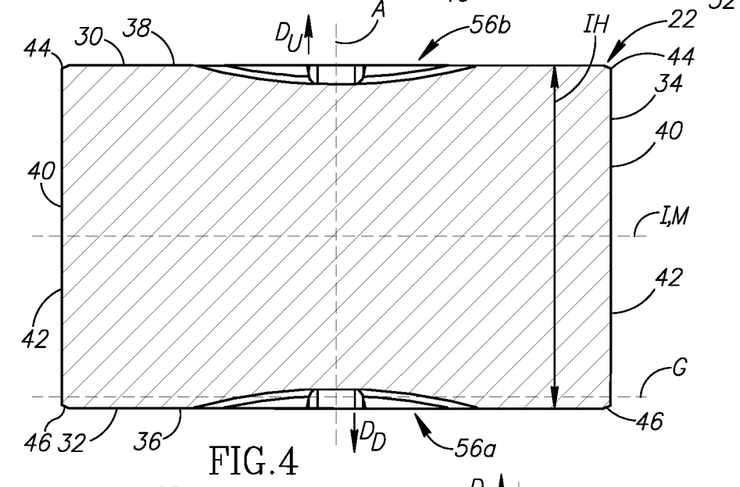
FIG. 4 is a cross-sectional view of the cutting insert taken along line IV-IV in FIG. 5.

Reference is now made to FIGS. 3 to 6, showing the cutting insert 22, in accordance with the subject matter of the present application, relating to a first aspect of the invention. The cutting insert 22 has a unitary integral one-piece construction. The cutting insert 22 has an insert central axis A. The insert central axis A defines opposite up and down directions $D_U$, $D_D$. The cutting insert 22 includes opposing insert upper and lower surfaces 30, 32 an insert peripheral surface 34 that extends between the insert upper and lower surfaces 30, 32. The insert upper and lower surfaces 30, 32 define the thickness of the cutting insert 22. The insert central axis A extends through (i.e. intersects) the insert upper and lower surfaces 30, 32. The cutting insert 22 has an insert median plane M that is oriented perpendicular to the insert central axis A and that passes midway between the insert upper and lower surfaces 30, 32. Referring to FIG. 4, the cutting insert 22 has an insert height IH measured between the insert upper and lower surfaces 30, 32 in the direction of the insert central axis A.

Figure 4A:
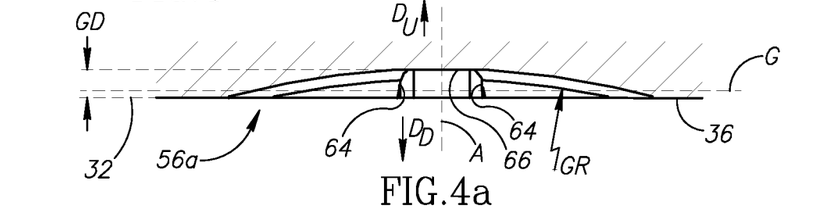
FIG. 4a is a detail in FIG. 4.

It should be noted that use of the terms "upward" and "downward" throughout the description and claims refer to a relative position in a direction of the tool insert longitudinal axis A vertically upwards and downwards, respectively, in FIGS. 4 and 4a.

Figure 5:
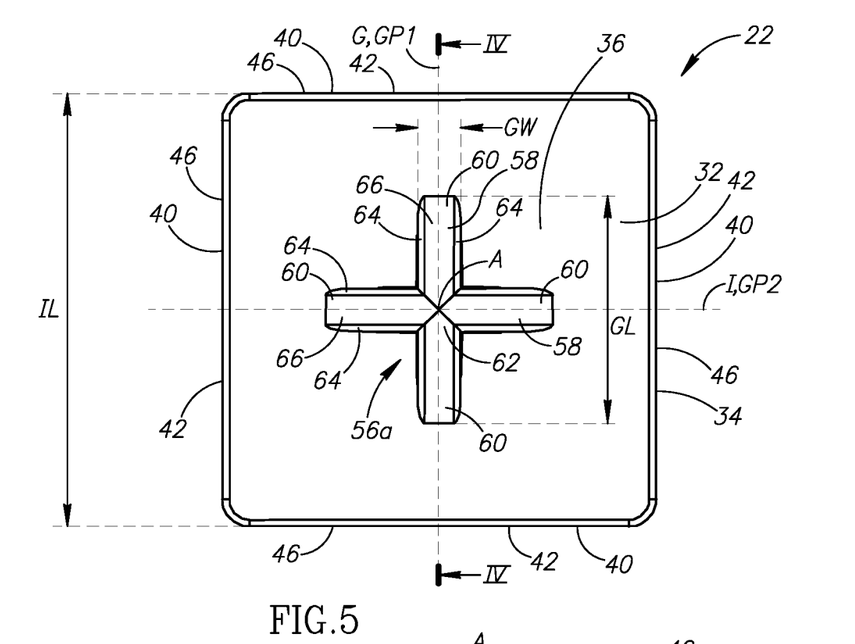
FIG. 5 is a bottom view of the cutting insert in FIG. 3.
Figure 6:
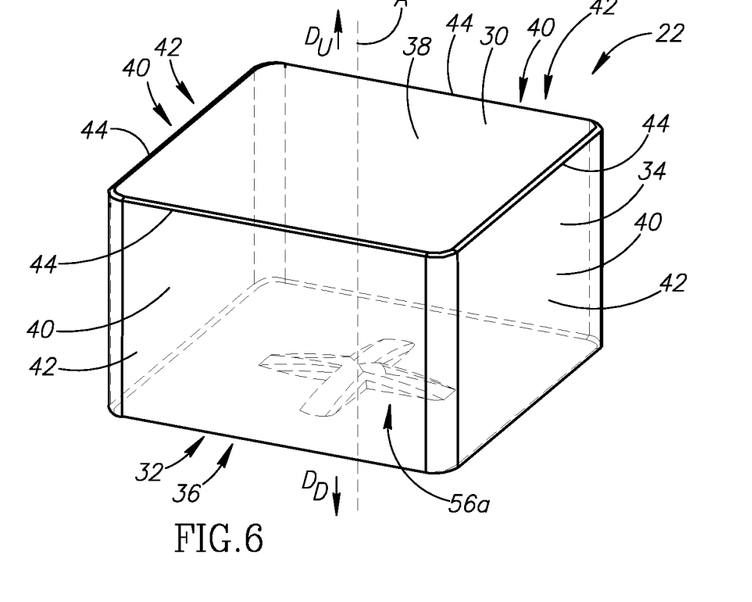
FIG. 6 is a perspective view of a single-sided cutting insert, in accordance with the present invention.

Referring to FIGS. 4 to 6, in accordance with some embodiments of the subject matter of the present application, the insert lower surface 32 can includes an insert lower bearing surface 36. The insert lower bearing surface 36 is configured for contacting a corresponding surface in the holder pocket 26 when the cutting insert 22 is seated therein. The insert lower bearing surface 36 can be planar and oriented perpendicular to the insert central axis A. The insert upper surface 30 can include an insert upper clamping surface 38. The insert upper clamping surface 38 is configured for being clamped by the clamping member 28. Similar to the insert lower bearing surface 36, the insert upper clamping surface 38 can be planar and oriented perpendicular to the insert central axis A (i.e., parallel to the insert lower bearing surface 36).

The insert peripheral surface 34 extends circumferentially about the insert central axis A. The insert peripheral surface 34 includes at least one planar major insert side abutment surface 40. The at least one major insert side abutment surface 40 is configured for contacting a corresponding surface in the holder pocket 26 when the cutting insert 22 is seated therein. In this non-limiting example shown in the drawings, the insert peripheral surface 34 includes exactly four major insert side abutment surface 40, which can allow the cutting insert 22 to be indexed (four ways) on each side. Each adjacent pair of major insert side abutment surface 40 can be perpendicular to each other. All the major insert side abutment surfaces 40 can be identical to each other. In such a configuration (as shown in the non-limiting examples shown in the drawings) the cutting insert 22 can have a cuboid basic shape, where the insert upper and lower surfaces 30, 32 are non-round.

In accordance with some embodiments of the subject matter of the present application, the insert peripheral surface 34 can include at least one planar minor insert side abutment surface 42 circumferentially spaced apart from the at least one major insert side abutment surface 40 about the insert central axis A. In this non-limiting example shown in the drawings, the insert peripheral surface 34 includes exactly four minor insert side abutment surface 42. Each minor insert side abutment surface 42 can be formed at a respective major insert side abutment surface 40.

The cutting insert 22 includes at least one upper cutting edge 44. The at least one upper cutting edge 44 is formed at the intersection of the insert peripheral surface 34 and the insert upper surface 30. It is noted that the at least one upper cutting edge 44 does not extend in the thickness direction of the cutting insert 22, unlike the cutting edge disclosed in U.S. Pat. No. 7,121,769 351. Each upper cutting edge 44 is circumferentially displaced from a corresponding one of the at least one insert side abutment surfaces 40. In the case of a four-sided insert, each upper cutting edge 44 is circumferentially opposite (by a 180° rotation about the insert central axis A) its corresponding insert side abutment surface 40. In accordance with some embodiments of the subject matter of the present application, the cutting insert 22 can include N upper cutting edges 44 circumferentially spaced apart about the insert central axis A, where N is a positive integer greater than 1. That is to say, the cutting insert 22 can be N-way indexable on the insert upper surface 30. Thus, in the case of a three-sided cutting insert, the upper cutting edge 44 would be circumferentially adjacent (by a 120° rotation about the insert central axis A) its corresponding side abutment surface.

In accordance with some embodiments of the subject matter of the present application, the cutting insert 22 can include at least one lower cutting edge 46 formed at the intersection of the insert peripheral surface 34 and the insert lower surface 32. In such case, the cutting insert 22 is double-sided, and can be seated in the holder pocket 26 on either of the insert upper and lower bearing surfaces 36, 38. In other words, the cutting insert 22 is "reversible" (i.e. rotatable 180° around an insert minor axis I oriented perpendicular to the insert central axis A and contained in the insert median plane M) so that the insert lower surface 32 becomes the insert upper surface 30 and vice versa. The cutting insert 22 can include the same number of lower cutting edges 46 as upper cutting edges 44. Thus, the cutting insert 22 can include N lower cutting edges 46 circumferentially spaced apart about the insert central axis A. That is to say, the cutting insert 22 can be N-way indexable on the insert lower surface 30.

The insert upper surface 30 includes at least one upper rake surface 48 that extends along the at least one upper cutting edge 44. In accordance with some embodiments of the subject matter of the present application, the at least one upper rake surface 48 can connect the at least one upper cutting edge 44 to the insert upper clamping surface 38. The insert peripheral surface 34 includes at least one upper relief surface 50 that extends along the upper cutting edges 44. In the double-sided configuration, similarly, the insert lower surface 32 can include at least one lower rake surface 52 that can be configured and oriented in an identical manner as at least one upper rake surface 48. The insert peripheral surface 34 includes at least one lower relief surface 54 that extends along the lower cutting edges 46.

The cutting insert 22 includes an anti-slip recess 56 recessed in the insert lower surface 32, which defines a lower anti-slip recess 56a. The lower anti-slip recess 56a primarily serves to prevent the cutting insert 22 from slipping out of the holder pocket 26. As a secondary function, the lower anti-slip recess 56a serves to give notification that the cutting insert 22 is in a correct indexable position in the holder pocket 26. In accordance with some embodiments of the subject matter of the present application, the lower anti-slip recess 56 can be centrally located on the insert lower surface 32. The lower anti-slip recess 56a may not open out to the insert upper surface 30. That is to say, the lower anti-slip recess 56a is a blind recess opening out only to the insert lower surface 32 at a single opening. In accordance with some embodiments of the subject matter of the present application, the cutting insert 22 can include exactly one lower anti-slip recess 56a recessed in the insert lower surface 32.

The lower anti-slip recess 56a includes at least one anti-slip groove 58, which is straight and elongated. The at least one anti-slip groove 58 is designed to receive a complementary anti-slip rib located in the holder pocket 26. The at least one anti-slip groove 58 has a groove longitudinal axis G. The at least one anti-slip groove 58 extends longitudinally along the respective groove longitudinal axis G. Preferably, the at least one anti-slip groove 58 can extend continuously along the respective groove longitudinal axis G, as opposed to having two (or more) spaced apart segments. Each major insert side abutment surface 40 is oriented parallel to the groove longitudinal axis G of a respective anti-slip groove 58. In accordance with some embodiments of the subject matter of the present application, the at least one anti-slip groove 58 can exhibit mirror symmetry about a first groove plane GP1 containing the groove longitudinal axis G and the insert central axis A. The at least one anti-slip groove 58 can exhibit mirror symmetry about a second groove plane GP2 oriented perpendicular to the groove longitudinal axis G and containing the insert central axis A. Thus, the at least one anti-slip groove 58 can exhibit two-way rotational symmetry about the insert central axis A. The at least one anti-slip groove 58 may be spaced apart from (i.e. not extend to) the insert peripheral surface 34. That is to say, the lower anti-slip recess 56a may be spaced apart from the insert peripheral surface 34. Thus, advantageously, the cutting insert 22, in particular the insert peripheral surface 34, is not detrimentally weakened by removal or absence of material to create the groove 58.

Each anti-slip groove 58 includes two opposite groove extremities 60 and a groove middle portion 62 therebetween. The two groove extremities 60 extend along the groove longitudinal axis G and are thus "axially extending". The groove middle portion 62 is intersected by the insert central axis A.

As seen in FIG. 5, the anti-slip groove 58 may have a groove length GL which is smaller than the insert length IL, both lengths being measured along the groove longitudinal axis G. In some embodiments, the groove length GL is between 20% and 80% of the insert length IL. Thus, in such embodiments, the opposite ends of the groove 58 (i.e., the groove extremities 60) are spaced apart from the insert peripheral surface 34 between 10% and 40% of the insert length IL. The anti-slip groove 58 also has a groove width GW which is measured in a direction perpendicular to the groove longitudinal axis G. In some embodiments, the groove width GW is between 10% and 40% the groove length GL.

In accordance with some embodiments of the subject matter of the present application, the at least one anti-slip groove 58 can include two opposite groove side walls 64 and a groove central surface 66 which extends therebetween. The two opposite groove side walls and the groove central surface 66 can all extend longitudinally in the direction of the groove longitudinal axis G. Stated differently, the two groove side walls 64 and the groove central surface 66 all extend between the two groove extremities 60. Referring to FIG. 4a, in a cross sectional view taken in the first groove plane GP1, the groove central surface 66 has a groove depth GD, measured in the direction of the insert central axis A from the insert lower bearing surface 36, that can decrease in a direction away from the groove middle portion 62 towards the two groove extremities 60. Thus, the groove depth GD can be maximum at the insert central axis A. The maximum groove depth GD can be less than 2 mm. The maximum groove depth GD can be less 20% of the insert height IH. In the cross sectional view taken in the first groove plane GP1, the groove central surface 66 can be concavely curved in a direction along the groove longitudinal axis G and can have a groove radius GR. In a cross sectional view taken in a plane perpendicular to the groove longitudinal axis G (i.e. parallel to the second groove plane GP2) and passing through the at least one anti-slip groove 58, the two groove side walls 64 can converge towards each other in a direction from the insert lower surface 30 towards the insert upper surface 32.

Thus, the cutting insert 22 can be manufactured by pressing and allows for it to be manufactured without any post-processing (e.g. grinding) to form the groove 56. As such, the groove 58 is a pressed groove 58 (i.e., a non-ground groove) which lacks indicia that it was formed by grinding. Those of ordinary skill in the art are able to determine whether such a groove has been formed by grinding based on indicia such as surface smoothness and/or the presence of grinding marks. Furthermore, the pressed groove lacks undercuts in a direction along the insert central axis A.

In accordance with some embodiments of the subject matter of the present application, the lower anti-slip recess 56a can include M anti-slip grooves 58, where M is a positive integer. The number of anti-slip grooves 58 determines the number of indexable positions the cutting insert 22 has for each side (i.e. on the insert lower or upper surfaces 30, 32) thereof, when seated in the holder pocket 26. When the number of cutting edges N is even, M can be equal to N/2. Thus, each anti-slip groove 58 allows for two indexable positions. When N is odd, M can be equal to N. Thus, each anti-slip groove 58 allows for one indexable position.

In accordance with some embodiments of the subject matter of the present application, the lower anti-slip recess 56a can include a plurality of anti-slip grooves 58 (i.e. M>=2). In such a configuration, the plurality of anti-slip grooves 58 all intersect each other at the groove middle portions 62. It is noted that the groove middle portion 62 of any anti-slip groove 58 is common to all the other anti-slip grooves 58. The plurality of anti-slip grooves 58 can be identical. The plurality of anti-slip grooves 58 can be equally angularly arranged about the insert central axis A and intersect one another. In particular, the plurality of anti-slip groove 58 can be arranged so that the lower anti-slip recess 56a can exhibit rotational symmetry about the insert central axis A. In the double-sided configuration of the cutting insert 22, in accordance with some embodiments of the subject matter of the present application, the cutting insert 22 can include an additional anti-slip recess 56 recessed in the insert upper surface 30, which defines an upper anti-slip recess 56b. It is noted that all the features described herein the description that relate to the lower anti-slip recess 56a can apply to the upper anti-slip recess 56b. The upper anti-slip recess 56b can be identical to the lower anti-slip recess 56a. The upper anti-slip recess 56b can be spaced apart from (i.e. not connected with) the lower anti-slip recess 56a. As with the lower anti-slip recess 56a, the cutting insert 22 can include exactly one upper anti-slip recess 56b recessed in the insert upper surface 30.

Figure 7:
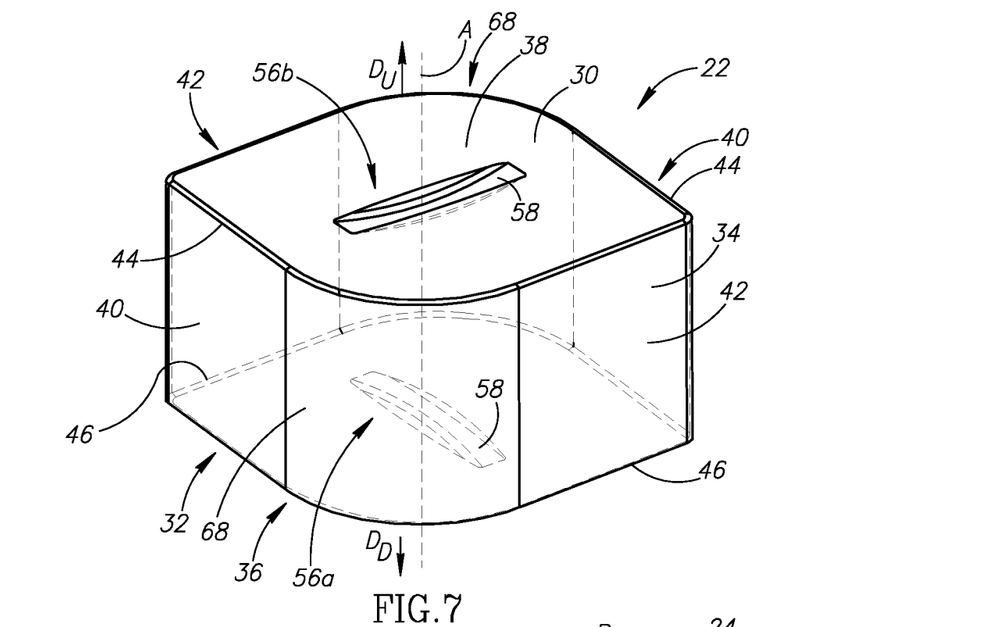
FIG. 7 is a perspective view of another double-sided cutting insert, in accordance with the present invention.

Further in the double-sided configuration of the cutting insert 22, in accordance with some embodiments of the subject matter of the present application, the cutting insert 22 can include exactly two upper cutting edges 44 and exactly two lower cutting edges 46 (FIG. 7). The cutting insert 22 is two-way indexable per side. The insert peripheral surface 34 can include a plurality of curved corner surfaces 68 alternating in the circumferential direction with the plurality of major insert side abutment surface 40. Each of the lower and upper anti-slip recesses 56a, 56b can include exactly one anti-slip groove 58. The anti-slip groove 58 at the lower anti-slip recess 56a can be oriented perpendicular to the anti-slip groove 58 at the upper anti-slip recess 56b. Thus, the lower and upper anti-slip recesses 56a, 56b are non-aligned in a view along the insert central axis A. This prevents a user attaching the cutting insert 22 to the holder pocket 26 in an incorrect position.

In accordance with some other embodiments of the subject matter of the present application, the cutting insert 22 can include exactly four upper cutting edges 44 (FIG. 3). The cutting insert 22 is thus four-way indexable on the insert lower surface 32. The lower anti-slip recesses 56a can include exactly two anti-slip grooves 58 oriented perpendicular to each other. The two anti-slip grooves 58 can form a cross-shape. In the double-sided configuration, the cutting insert 22 can include exactly four lower cutting edges 46. The upper anti-slip recesses 56b can include exactly two anti-slip grooves 58 oriented perpendicular to each other. Each anti-slip groove 58 at the lower anti-slip recess 56a can be oriented parallel to a respective anti-slip groove 58 at the upper anti-slip recess 56b. Thus, the lower and upper anti-slip recesses 56a, 56b can be aligned in a view along the insert central axis A.

A second aspect of the subject matter of the present application relates to the insert holder 24. Attention is drawn to FIGS. 8 to 10. The insert holder 24 has a holder longitudinal axis H which defines opposite forward and rearward directions $D_F$, $D_R$. The insert holder 24 includes a holder main surface 70 that intersects a holder end surface 72. The holder main surface 70 extends circumferentially about the holder longitudinal axis H. The holder end surface 72 is intersected by the holder longitudinal axis H and faces generally in the forward direction $D_F$.

Figure 9:
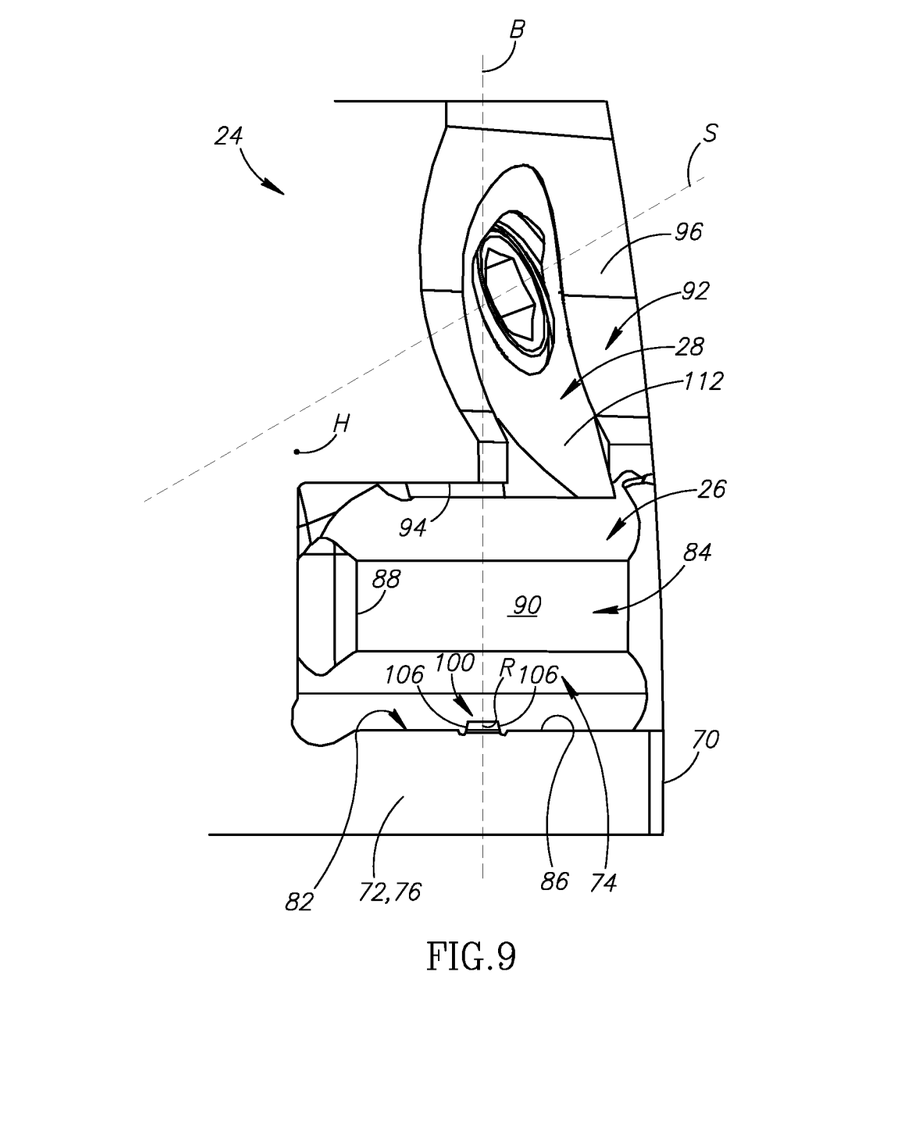
FIG. 9 is a first side view of the holder pocket in FIG. 8 in front of a pocket minor opening, with a clamping member attached.
Figure 10:
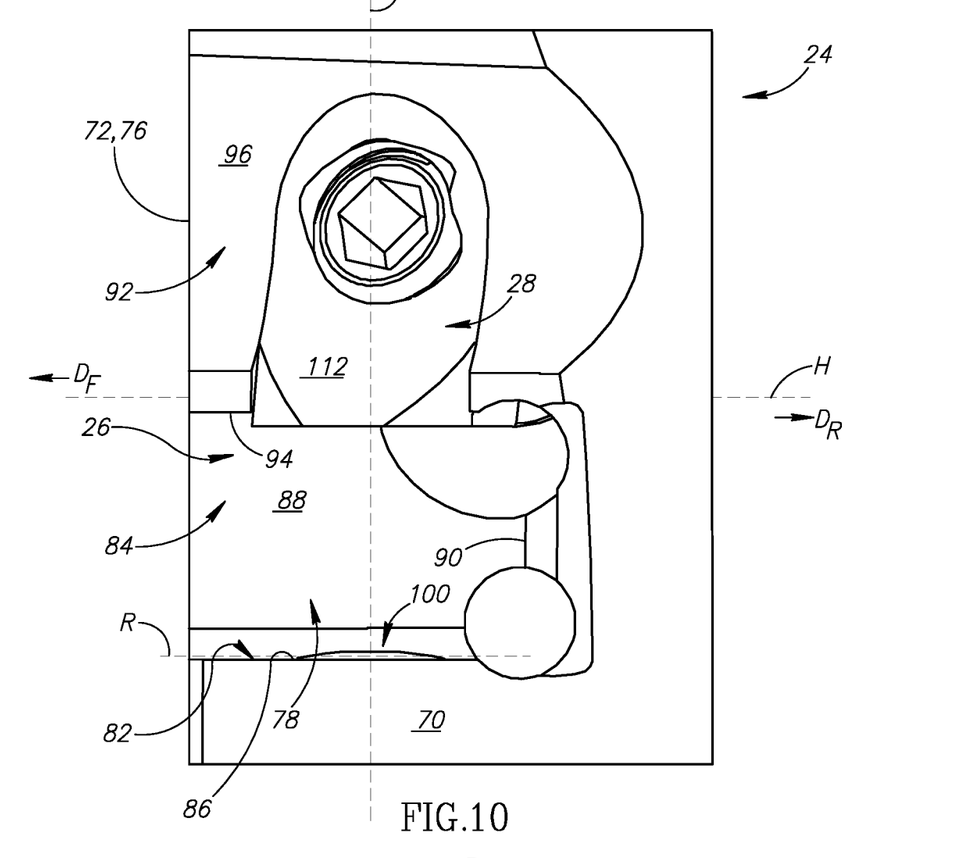
FIG. 10 is a second side view of the holder pocket in FIG. 8 in front of a pocket major opening, with the clamping member attached.
Figure 11:
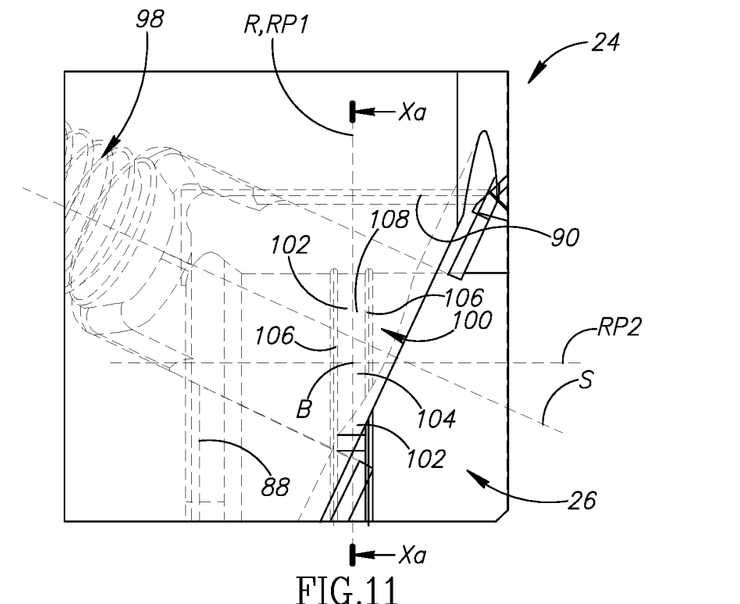
FIG. 11 is a top view of the holder pocket in FIG. 8.
Figure 12:
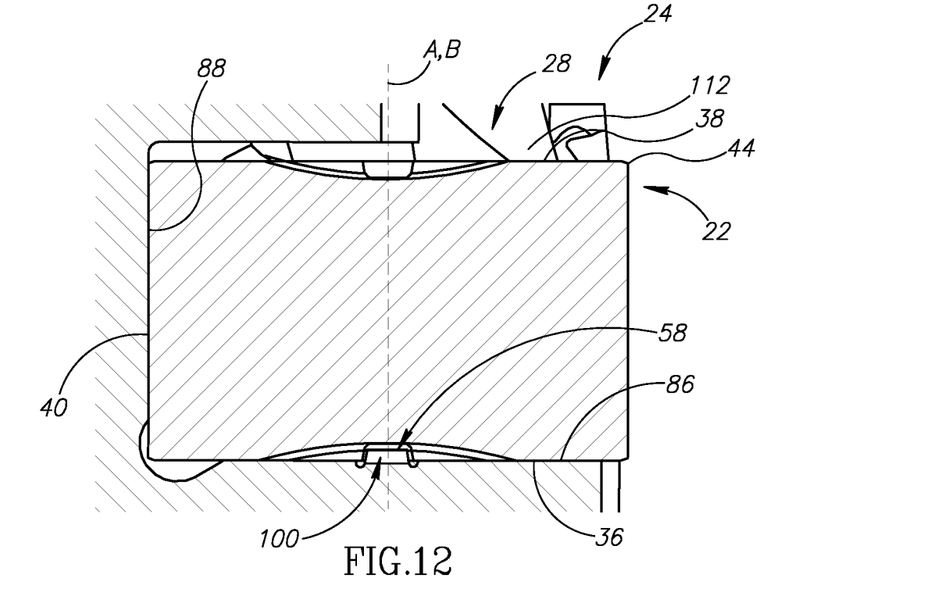
FIG. 12 is a cross-sectional view of the cutting tool, in the fastened position, taken in a plane perpendicular to the rib longitudinal axis and passing though the anti-slip rib.

It should be noted that use of the terms "forward" and "rearward" throughout the description and claims refer to a relative position in a direction of the tool holder longitudinal axis B vertically upwards and downward, respectively, in FIG. 10 (and towards and away from the reader in FIGS. 9 and 11). Generally speaking, the forward direction $D_F$ is the direction towards the cutting insert 22.

The insert holder 24 includes a holder pocket 26 for releasably attaching the cutting insert 22 therein. The holder pocket 26 has a pocket major axis B. The holder pocket 26 has a unitary integral one-piece construction. The holder pocket 26 is recessed in the holder main surface 70. The holder pocket 26 opens out to the holder main surface 70 at a pocket major opening 74. In accordance with some embodiments of the subject matter of the present application, the holder pocket 26 can open out to a pocket outer lateral surface 76 of the insert holder 24 at a pocket minor opening 78. In this non-limiting example shown in the drawings, the pocket outer lateral surface 76 can be formed at the holder end surface 72. Alternatively, the insert holder 24 can include a peripheral recess recessed in the holder main surface 70 and opening out thereto, adjacent the holder pocket 26 (not shown). The pocket outer lateral surface 76 can be formed at the peripheral recess. The holder longitudinal axis H and the pocket major axis B can be non-parallel to each other. The holder longitudinal axis H can be slanted with respect to the pocket major axis B.

The holder pocket 26 includes a pocket base surface 82 and a pocket peripheral surface 84. The pocket peripheral surface 84 is oriented substantially perpendicularly to the pocket base surface 82 and forms a partial boundary of the pocket base surface 82. The pocket base surface 82 is unbounded by the pocket peripheral surface 84 at the pocket major opening 74 and optionally at the pocket minor opening 78 if present. The pocket base surface 82 is intersected by the pocket major axis B.

Figure 8:
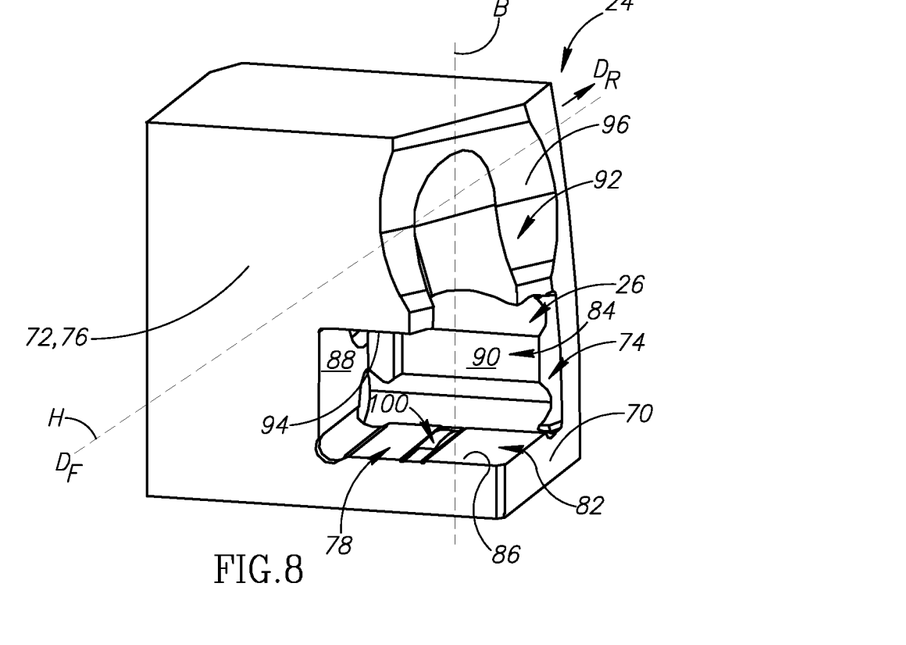
FIG. 8 is a perspective view of the holder pocket in FIG. 1.

Referring to FIGS. 8 to 10, the pocket base surface 82 includes at least one pocket support surface 86. The at least one pocket support surface 86 is configured for contacting a corresponding surface in the cutting insert 22 when the cutting insert 22 is seated therein. In accordance with some embodiments of the subject matter of the present application, the at least one pocket support surface 86 can be planar and oriented perpendicular to the pocket major axis B.

The pocket peripheral surface 84 extends circumferentially about the pocket major axis B. The pocket peripheral surface 84 includes a planar major pocket side abutment surface 88 located opposite, and facing towards, the pocket major opening 74. The major pocket side abutment surface 88 is configured for contacting a corresponding surface in the cutting insert 22 when the cutting insert 22 is seated therein.

In accordance with some embodiments of the subject matter of the present application, the pocket peripheral surface 84 can further include a planar minor pocket side abutment surface 90 which is circumferentially spaced apart from the major pocket side abutment surface 88 about the pocket major axis B. The minor pocket side abutment surface 90 is configured for contacting a corresponding surface in the cutting insert 22 when the cutting insert 22 is seated therein. The minor pocket side abutment surface 90 can be located opposite the pocket minor opening 78. The minor pocket side abutment surface 90 can be oriented perpendicular to the major pocket side abutment surface 88.

In accordance with some embodiments of the subject matter of the present application, the holder pocket 26 can include a pocket overhang portion 92 integrally formed with the holder pocket 26. The pocket overhang portion 92 can overhang the pocket base surface 82. The pocket major axis B can intersect the pocket overhang portion 92. The pocket overhang portion 92 may overhang the pocket base surface 82 to such an extent that it would impede access to a retaining screw for threadingly engaging a threaded bore in the pocket base surface 82, in order to releasably clamp the cutting inset 22 in the holder pocket 26. Thus, the holder pocket 26 can be devoid of a threaded bore opening out to the pocket base surface 82 since a retaining screw cannot be used for clamping purposes.

In accordance with some embodiments of the subject matter of the present application, the pocket overhang portion 92 can include an overhang inner surface 94 which faces towards the pocket base surface 82. The overhang inner surface 94 can be planar and parallel to the at least one pocket support surface 86. The pocket overhang portion 92 can include an overhang transverse surface 96 that intersects the overhang inner surface 94 and is oriented transversely thereto. Generally speaking, the overhang transverse surface 96 can be formed on the holder main surface 70. Preferably, the overhang transverse surface 96 can be relieved (i.e. slope towards the holder longitudinal axis H).

Reference is made to FIGS. 2 and 11. Instead of a retaining screw passing through the cutting insert 22, in accordance with some embodiments of the subject matter of the present application, the holder pocket 26 can include a pocket threaded bore 98 that is designed for threadingly receiving the clamping member 28 in order to secure the cutting insert 22 to the insert holder 24. The pocket threaded bore 98 can be recessed in, and open out to, at least the overhang transverse surface 96. Optionally the pocket threaded bore 98 can also open out to the overhang inner surface 94. The pocket threaded bore 98 extends along a threaded bore axis S. The threaded bore axis S and the pocket major axis B can be non-parallel to each other. That is to say, the threaded bore axis S can be slanted with respect to the pocket major axis B.

The holder pocket 26 includes an elongated and straight anti-slip rib 100 projecting from the pocket base surface 82. The anti-slip rib 100 is designed to be received a respective one of the anti-slip grooves 58. The anti-slip rib 100 has a rib longitudinal axis R. The anti-slip rib 100 extends longitudinally along the rib longitudinal axis R. Preferably, the anti-slip rib 100 can extend continuously along the rib longitudinal axis R. The major pocket side abutment surface 88 is oriented parallel to the rib longitudinal axis R. Thus advantageously, the angle of rotation of a rotary cutting tool (used for manufacture of the anti-slip rib 100), does not need to be reconfigured when the major pocket side abutment surface 88 is manufactured (or vice versa).

In accordance with some embodiments of the subject matter of the present application, the anti-slip rib 100 can exhibit mirror symmetry about a first rib plane RP1 which contains the rib longitudinal axis R and the pocket major axis B. The anti-slip rib 100 can exhibit mirror symmetry about a second rib plane RP2 oriented perpendicular to the rib longitudinal axis R and containing the pocket major axis B. Thus, the anti-slip rib 100 can exhibit two-way (180°) rotational symmetry about the pocket major axis B. The anti-slip rib 100 may be spaced apart from (i.e. not extend to) the minor pocket side abutment surface 90. Similarly, the anti-slip rib 100 may be spaced apart from the pocket minor opening 78. The rib longitudinal axis R can be parallel to the holder longitudinal axis H.

The anti-slip rib 100 includes two opposite rib extremities 102 and a rib middle portion 104 therebetween. The two rib extremities 102 extend along the rib longitudinal axis R and are thus "axially extending". The rib middle portion 104 is intersected by the pocket major axis B.

Figure 10A:
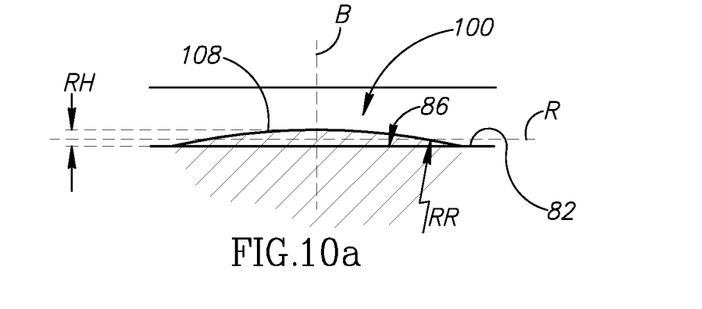
FIG. 10a is a fragmentary cross-sectional view taken along the line Xa-Xa in FIG. 11.

In accordance with some embodiments of the subject matter of the present application, the anti-slip rib 100 can include two rib side walls 106 and a rib central surface 108 which extends therebetween. The two rib side walls 106 and the rib central surface 108 can all extend longitudinally in the direction of the rib longitudinal axis R. Stated differently, the two rib side walls 106 and the rib central surface 108 all extend between the two rib extremities 102. The anti-slip rib can have a shape that corresponds to a respective anti-slip groove 58. For example, in a cross sectional view taken in the first rib plane RP1, the rib central surface 108 has a rib height RH, measured in the direction of the pocket major axis B from the pocket support surface 86, that can decrease in a direction away from the rib middle portion 104 to either of the two rib extremities 102 (See FIG. 10a). Thus, the rib height RH is maximum at the pocket major axis B. The maximum rib height RH can be less than 2 mm. In the cross sectional view taken in the first rib plane RP1, the rib central surface 108 can be convexly curved in a direction along the rib longitudinal axis R and have a rib radius RR. In a cross sectional view taken in a plane perpendicular to the rib longitudinal axis R (i.e. parallel to the second rib plane RP2) and passing through the anti-slip rib 100, the two rib side walls 106 can converge towards each other in a direction away from the pocket base surface 82 towards the pocket overhang portion 92.

In accordance with some embodiments of the subject matter of the present application, the at least one pocket support surface 86 can include exactly two co-planar pocket support surfaces 86 which are located on opposite sides of the anti-slip rib 100.

The seating and support of the cutting insert 22 in the holder pocket 26 will be described with reference to FIGS. 1, 2 and 11. In the fastened position of the cutting tool 20, the cutting insert 22 is releasably retained in the holder pocket 26 of the insert holder 24. In this non-limiting example shown in the drawings, the clamping member 28 includes clamping threaded male portion 110 and a clamping female portion 112. As seen in FIG. 2, the clamping threaded male portion 110 may have a first end configured to engage the pocket threaded bore 98 and a second end configured to engage the clamping female portion 112. In accordance with some embodiments of the subject matter of the present application, the clamping threaded male portion 110 and the clamping female portion 112 can be threadingly attachable to each other. The clamping threaded portion 110 can be spaced apart from the clamping non-threaded portion 112 along a longitudinal axis of the clamping member.

The cutting insert 22 is releasably retained to the insert holder 24 by the clamping male threaded portion 110 threadingly received in the pocket threaded bore 98 and the clamping female portion 112 in clamping abutment with the insert upper surface 30. It is noted that in such a clamping configuration, the cutting insert 22 may be devoid of a through hole opening out to the insert upper and lower surfaces 30, 32, for accommodating a retaining screw (of the type disclosed in U.S. Pat. No. 7,645,100). The insert central axis A and the pocket major axis B can be co-incident. Thus, the pocket base surface 82 faces in the upward direction $D_U$.

Referring to FIG. 11, showing a cross-sectional view of the cutting tool 20, in the assembled position, taken in a plane perpendicular to the rib longitudinal axis R and passing though the anti-slip rib 100, the at least one pocket support surface 86 abuts the insert lower bearing surface 36. The major pocket side abutment surface 88 abuts an "operative" major insert side abutment surface 40. The anti-slip rib 100 is located in the "operative" anti-slip groove 58 that is oriented parallel to the major insert side abutment surface 40 that abuts the major pocket side abutment surface 88. This prevents the cutting insert 22 from slipping out of the holder pocket 28 in a radially outwards direction (with respect to the holder longitude axis H) during operation. However, replacement or indexing of the cutting insert 22 is allowed by displacing the cutting insert 22 in the direction of the rib longitudinal axis R. In the configuration of the lower anti-slip recess 56a which includes the plurality of anti-slip grooves 58, the groove extremities 60 of the anti-slip grooves 58 oriented transverse (e.g., non-parallel) to the major pocket side abutment surface 88 can be unoccupied. That is to say, said "non-operative" anti-slip grooves 58 are considered to be unoccupied (even though the common groove middle portion(s) 62 does have the anti-slip rib 100 located therein).

In accordance with some embodiments of the subject matter of the present application, the minor pocket side abutment surface 90 can abut an "operative" minor insert side abutment surface 42. And even though the anti-slip rib 100 may be located in the operative anti-slip groove 58, the anti-slip rib 100 may not abut the operative anti-slip groove 58. Thus, over-constrained positioning, with respect to the abutment between the major pocket side abutment surface 88 and the respective major insert side abutment surface 40, is avoided.

It should further be noted that the ant-slip groove as described hereinabove is particular suitable for ceramic inserts. For example, the groove central surface 66 can be configured with a radius and/or shallow depth to reduce tool stresses during cutting operations. Moreover, the cutting insert 22 can be devoid of a through hole of the sort used for receiving a retaining screw.

Although the subject matter of the present application has been described to a certain degree of particularity, it should be understood that various alterations and modifications could be made without departing from the spirit or scope of the invention as hereinafter claimed.

What is claimed is:

1. A cutting tool (20) comprising:
  a cutting insert (22), having an insert central axis (A) defining opposite upward and downward directions ($D_U$, $D_D$), the cutting insert (22) comprising:
    opposite insert upper and lower surfaces (30, 32) and an insert peripheral surface (34) extending therebetween, the insert peripheral surface (34) extending circumferentially about the insert central axis (A) and comprising at least one planar major insert side abutment surface (40);
    at least one upper cutting edge (44) formed at the intersection of the insert peripheral surface (34) and the insert upper surface (30) and circumferentially displaced from the at least one major insert side abutment surface (40); and
    an anti-slip recess (56) recessed in the insert lower surface (32), defining a lower anti-slip recess (56a), the lower anti-slip recess (56a) comprising at least one elongated and straight anti-slip groove (58) having:
      a groove longitudinal axis (G);
      a first groove plane (GP1) containing the groove longitudinal axis (G) and the insert central axis (A);
      a second groove plane (GP2) perpendicular to the first groove plane (GP1) and containing the insert central axis (A); and
      two axially extending opposite groove extremities (60) and a groove middle portion (62) therebetween, the groove middle portion (62) being intersected by the insert central axis (A); wherein:
    the cutting insert (22) is devoid of a through hole opening out to the insert upper and lower surfaces (30, 32), for receiving a retaining screw; and
    each major insert side abutment surface (40) is oriented parallel to the groove longitudinal axis (G) of a respective anti-slip groove (58):
  wherein:
    the at least one elongated and straight anti-slip groove (58) is spaced apart from the insert peripheral surface (34) and
  an insert holder (24) having a holder longitudinal axis (H) defining opposite forward and rearward directions ($D_F$, $D_R$); the insert holder (24) comprising:
    a holder main surface (70) that intersects a holder end surface (72); and
    a holder pocket (26) recessed in the holder main surface (70) and opening out thereto at a pocket major opening (74), the holder pocket (26) having a pocket major axis (B) and comprising:
      a pocket base surface (82);
      a pocket peripheral surface (84) oriented substantially perpendicularly to the pocket base surface (82) and forming a partial boundary thereof, the pocket base surface (82) being unbounded by the pocket peripheral surface (84) at the pocket major opening (74), the pocket peripheral surface (84) extending circumferentially about the pocket major axis (B) and comprising a planar major pocket side abutment surface (88) located opposite, and facing towards, the pocket major opening (74);
      a pocket overhang portion (92) integrally formed with the holder pocket (26) overhanging the pocket base surface (82); and
      an elongated and straight anti-slip rib (100) projecting from the pocket base surface (82), the anti-slip rib (100) extending longitudinally along a rib longitudinal axis (R) and comprising:
        a first rib plane (RP1) containing the rib longitudinal axis (R) and the pocket major axis (B); and
        a second rib plane (RP2) perpendicular to the first rib plane (RP1) and containing the pocket major axis (B); wherein:
      the major pocket side abutment surface (88) is oriented parallel to the rib longitudinal axis (R); wherein:
    in a fastened position of the cutting tool (20):
      the cutting insert is releasably retained in the holder pocket (26);
      the major pocket side abutment surface (88) abuts an operative one of the at least one major insert side abutment surface (40);
      at least one pocket support surface (86) located on the pocket base surface (82) abuts an insert lower bearing surface (36) located on the insert lower surface (32);
      the anti-slip rib (100) occupies an operative one of the at least one anti-slip groove (58) that is oriented parallel to the operative major insert side abutment surface (40); and
      the anti-slip rib (100) does not abut the operative anti-slip groove (58).

2. The cutting tool (20), according to claim 1, wherein:
  the lower anti-slip recess (56a) comprises a plurality of anti-slip grooves (58); and
  in the fastened position of the cutting tool (20):
    any anti-slip grooves (58) oriented non-parallel to the operative major pocket side abutment surface (88) are unoccupied.

3. The cutting tool (20), according to claim 1, wherein:
the insert peripheral surface (34) further comprises at least one planar minor insert side abutment surface (42) circumferentially spaced apart from the at least one major insert side abutment surface (40) about the insert central axis (A);
the pocket peripheral surface (84) further comprises a planar minor pocket side abutment surface (90) circumferentially spaced apart from the major pocket side abutment surface (88) about the pocket major axis (B); and
in the fastened position of the cutting tool (20):
the minor pocket side abutment surface (90) abuts an operative one of the at least one planar minor insert side abutment surface (42).

4. The cutting tool (20), according to claim 1, wherein:
the insert upper surface (30) comprises an insert upper clamping surface (38);
the insert holder (24) comprises a separate clamping member (28) comprising a clamping male threaded portion (110) having at least one male thread and a clamping female portion (112) having a female thread;
the pocket overhang portion (92) comprises:
an overhang inner surface (94) which faces towards the pocket base surface (82); and
an overhang transverse surface (96) which intersects the overhang inner surface (94) and is oriented transversely thereto; and
the holder pocket (26) further comprises:
a pocket threaded bore (98) which is recessed in, and open out to, at least the overhang transverse surface (96); and
in the fastened position of the cutting tool (20):
the cutting insert (22) is releasably retained to the insert holder (24) by the clamping male threaded portion (110) threadingly received in the pocket threaded bore (98) and the clamping female portion (112) in clamping abutment with the insert upper clamping surface (38).

5. A cutting tool (20) comprising:
a cutting insert (22), having an insert central axis (A) defining opposite upward and downward directions ($D_U$, $D_D$), the cutting insert (22) comprising:
opposite insert upper and lower surfaces (30, 32) and an insert peripheral surface (34) extending therebetween, the insert peripheral surface (34) extending circumferentially about the insert central axis (A) and comprising at least one planar major insert side abutment surface (40);
an insert lower bearing surface (36) located on the insert lower surface (32);
at least one upper cutting edge (44) formed at the intersection of the insert peripheral surface (34) and the insert upper surface (30);
an anti-slip recess (56) recessed in the insert lower surface (32), defining a lower anti-slip recess (56*a*), the lower anti-slip recess (56*a*) comprising at least one elongated and straight anti-slip groove spaced apart from the insert peripheral surface and (58) having:
a groove longitudinal axis (G);
a first groove plane (GP1) containing the groove longitudinal axis (G) and the insert central axis (A); and
two axially extending opposite groove extremities (60) and a groove middle portion (62) therebetween, the groove middle portion (62) being intersected by the insert central axis (A); wherein:
the cutting insert (22) is devoid of a through hole opening out to the insert upper and lower surfaces (30, 32), for receiving a retaining screw; and
an insert holder (24) having a holder longitudinal axis (H) defining opposite forward and rearward directions ($D_F$, $D_R$); the insert holder (24) comprising:
a holder main surface (70) that intersects a holder end surface (72); and
a holder pocket (26) recessed in the holder main surface (70) and opening out thereto at a pocket major opening (74), the holder pocket (26) having a pocket major axis (B) and comprising:
a pocket base surface (82) having at least one pocket support surface (86) located thereon;
a pocket peripheral surface (84) oriented substantially perpendicularly to the pocket base surface (82) and forming a partial boundary thereof, the pocket base surface (82) being unbounded by the pocket peripheral surface (84) at the pocket major opening (74), the pocket peripheral surface (84) comprising a planar major pocket side abutment surface (88) located opposite, and facing towards, the pocket major opening (74);
an elongated and straight anti-slip rib (100) projecting from the pocket base surface (82), the anti-slip rib (100) extending longitudinally along a rib longitudinal axis (R) and comprising:
a first rib plane (RP1) containing the rib longitudinal axis (R) and the pocket major axis (B); wherein:
in a fastened position of the cutting tool (20):
the cutting insert is releasably retained in the holder pocket (26);
the major pocket side abutment surface (88) abuts an operative one of the at least one major insert side abutment surface (40);
the at least one pocket support surface (86) abuts the insert lower bearing surface (36) of the insert lower surface (32);
the anti-slip rib (100) occupies an operative one of the at least one anti-slip groove (58) belonging to the anti-slip recess (56) recessed in the insert lower surface (32); and
the anti-slip rib (100) does not abut the operative anti-slip groove (58).

* * * * *